United States Patent
Haider et al.

(10) Patent No.: US 8,820,511 B2
(45) Date of Patent: Sep. 2, 2014

(54) MODIFIED HANDRAIL (75) Inventors: Viqar Haider, Port Elgin (CA); Andrew Oliver Kenny, Toronto (CA); Alexander Stuart Caunce, Cobourg (CA)

(73) Assignee: EHC Canada, Inc., Oshawa (CA)

( * ) Notice: Subject to any disclaimer, the term of this patent is extended or adjusted under 35 U.S.C. 154(b) by 928 days.

(21) Appl. No.: 12/677,418

(22) PCT Filed: Sep. 10, 2008

(86) PCT No.: PCT/CA2008/001599
§ 371 (c)(1),
(2), (4) Date: Jun. 4, 2010

(87) PCT Pub. No.: WO2009/033272
PCT Pub. Date: Mar. 19, 2009

(65) Prior Publication Data
US 2010/0258403 A1    Oct. 14, 2010

Related U.S. Application Data (60) Provisional application No. 60/971,163, filed on Sep. 10, 2007.

(51) Int. Cl.
| B65G 15/00 | (2006.01) |
| B32B 3/08 | (2006.01) |
| B66B 23/24 | (2006.01) |
| B32B 27/08 | (2006.01) |
| B32B 3/00 | (2006.01) |

(52) U.S. Cl.
CPC . B66B 23/24 (2013.01); B32B 3/08 (2013.01); B32B 27/08 (2013.01); B32B 3/00 (2013.01)
USPC .......................................................... 198/337

(58) Field of Classification Search
USPC ................... 198/335, 336, 337, 338
See application file for complete search history.

(56) References Cited

U.S. PATENT DOCUMENTS

| 1,049,613 A | 1/1913 | Seeburger |
| 1,101,209 A | 6/1914 | Pitt |
| 1,186,550 A | 6/1916 | Cobb |
| 2,373,764 A | 4/1945 | Lautrup et al. |
| 2,669,339 A | 2/1954 | Hansen |

(Continued)

FOREIGN PATENT DOCUMENTS

| CA | 898726 | 4/1972 |
| CA | 936569 | 11/1973 |
| CA | 1048301 | 2/1979 |
| CA | 1261583 | 9/1989 |
| CA | 2333553 A1 | 1/2000 |

(Continued)

OTHER PUBLICATIONS

Elevator World, Patents, Dec. 1990, p. 87.
Eckstein et al., Thermoforming Thermoplastic Polyurethanes, Plastics Engineering, May 1995, p. 29.
International Search Report issued Dec. 23, 2008 in respect of corresponding International Application No. PCT/CA2008/001599.
Declaration of Andrew Oliver Kenny.

*Primary Examiner* — Joseph Dillon, Jr.
(74) *Attorney, Agent, or Firm* — Bereskin & Parr LLP/S.E.N.C.R.L., s.r.l.

(57) ABSTRACT

Modified handrails for use in escalators, moving walkways and other transportation apparatus are provided. Handrail can include a configuration for a cable array as a stretch inhibitor that reduces cable buckling under severe flexing conditions. Handrail can also include a configuration for first and second thermoplastic layers in the lip portions that reduces strain and bending stresses and increases fatigue failure life under cyclic loading conditions. Handrail can also include, for the stretch inhibitor, the use of cables comprising large outer strands and small inner strands that enable penetration and adhesion within the first layer and can reduce incidence of fretting or corrosion.

10 Claims, 10 Drawing Sheets

(56) References Cited

U.S. PATENT DOCUMENTS

| | | | |
|---|---|---|---|
| 2,721,158 A | 10/1955 | Mans | |
| 2,879,881 A | 3/1959 | Tilton | |
| 2,956,662 A | 10/1960 | Hansen | |
| 2,979,431 A | 4/1961 | Perrault | |
| 3,048,256 A | 8/1962 | Skinner | |
| 3,212,627 A | 10/1965 | Beebee | |
| 3,411,980 A | 11/1968 | Leshin | |
| 3,414,109 A | 12/1968 | Clark | |
| 3,463,290 A | 8/1969 | Tajima | |
| 3,481,807 A | 12/1969 | Kanamori | |
| 3,623,590 A | 11/1971 | Johnson | |
| 3,633,725 A | 1/1972 | Smith | |
| RE27,439 E | 7/1972 | Jackson | |
| 3,689,341 A | 9/1972 | Ninomiya | |
| 3,693,218 A | 9/1972 | Jaubert et al. | |
| 3,724,645 A | 4/1973 | Spaar | |
| 3,778,882 A | 12/1973 | Cameron et al. | |
| 3,783,063 A | 1/1974 | Olsson | |
| 3,783,704 A | 1/1974 | Lawson | |
| 3,865,225 A | 2/1975 | Phal | |
| 3,872,735 A | 3/1975 | Hnatek | |
| 3,874,968 A | 4/1975 | Robinson | |
| 3,885,071 A | 5/1975 | Blad et al. | |
| 3,909,176 A | 9/1975 | Madonini | |
| 3,949,858 A | 4/1976 | Ballocci et al. | |
| 3,956,056 A | 5/1976 | Boguslawski et al. | |
| 3,981,206 A | 9/1976 | Miranti, Jr. et al. | |
| 4,032,384 A | 6/1977 | Rauscher | |
| 4,034,617 A | 7/1977 | Guyer | |
| 4,050,322 A | 9/1977 | Moring | |
| 4,059,974 A | 11/1977 | Fleissner | |
| 4,087,223 A | 5/1978 | Angioletti et al. | |
| 4,134,883 A * | 1/1979 | Mendelsohn et al. | 528/63 |
| 4,161,769 A | 7/1979 | Elliott | |
| 4,169,393 A | 10/1979 | Wetzel et al. | |
| 4,274,821 A | 6/1981 | Kiemer | |
| 4,359,501 A | 11/1982 | DiTullio | |
| 4,381,273 A | 4/1983 | Azzola | |
| 4,427,107 A | 1/1984 | Roberts et al. | |
| 4,439,387 A | 3/1984 | Hawley | |
| 4,469,729 A | 9/1984 | Watanabe et al. | |
| 4,548,663 A | 10/1985 | Worcester | |
| 4,563,140 A | 1/1986 | Turecek | |
| 4,564,542 A | 1/1986 | Worcester | |
| 4,578,024 A | 3/1986 | Sicka et al. | |
| 4,581,807 A | 4/1986 | Adell | |
| 4,600,549 A | 7/1986 | Rajala et al. | |
| 4,618,387 A | 10/1986 | Fisher et al. | |
| 4,650,446 A | 3/1987 | Pinto et al. | |
| 4,681,646 A | 7/1987 | Pinto et al. | |
| 4,767,244 A | 8/1988 | Peterson | |
| 4,776,446 A | 10/1988 | Fisher et al. | |
| 4,839,220 A | 6/1989 | Stijntjes et al. | |
| 4,852,713 A | 8/1989 | Tatai et al. | |
| 4,891,040 A | 1/1990 | Nagai et al. | |
| 4,934,100 A | 6/1990 | Adell | |
| 4,946,020 A | 8/1990 | Rivera et al. | |
| 4,948,354 A | 8/1990 | Minaudo | |
| 4,957,199 A | 9/1990 | Wokke et al. | |
| 4,982,829 A * | 1/1991 | Johnson et al. | 198/337 |
| 5,020,256 A | 6/1991 | French | |
| 5,083,985 A | 1/1992 | Alles | |
| 5,115,900 A | 5/1992 | Nurnberg et al. | |
| 5,160,009 A | 11/1992 | Iyoda et al. | |
| 5,162,151 A | 11/1992 | Smith et al. | |
| 5,165,643 A | 11/1992 | Shreiner | |
| 5,255,772 A | 10/1993 | Ball et al. | |
| 5,275,270 A * | 1/1994 | Dobo | 198/337 |
| 5,508,103 A | 4/1996 | Cope | |
| 6,086,806 A | 7/2000 | Weatherall et al. | |
| 6,237,740 B1 | 5/2001 | Weatherall et al. | |
| 6,673,431 B1 | 1/2004 | Ledzinski | |
| 6,761,259 B1 * | 7/2004 | Onodera et al. | 198/335 |
| 7,200,915 B2 | 4/2007 | Keun | |
| 7,398,869 B2 * | 7/2008 | Novacek et al. | 198/335 |
| 7,404,477 B1 | 7/2008 | Toennisson et al. | |
| 7,594,570 B2 * | 9/2009 | Miessbacher | 198/335 |
| 7,641,038 B2 * | 1/2010 | El-Wardany et al. | 198/335 |
| 7,766,150 B2 * | 8/2010 | Guo et al. | 198/335 |
| 8,006,823 B2 * | 8/2011 | Holzner et al. | 198/337 |
| 8,186,498 B2 * | 5/2012 | Kawasaki et al. | 198/337 |
| 8,206,528 B2 * | 6/2012 | Qureshi | 156/90 |
| 2002/0084169 A1 | 7/2002 | Schulte et al. | |
| 2005/0173224 A1 | 8/2005 | Caunce | |
| 2006/0237284 A1 * | 10/2006 | Miessbacher | 198/336 |
| 2009/0127067 A1 | 5/2009 | Guo et al. | |
| 2009/0218192 A1 | 9/2009 | Holzner et al. | |
| 2010/0117263 A1 | 5/2010 | Wesson et al. | |

FOREIGN PATENT DOCUMENTS

| | | | |
|---|---|---|---|
| CA | 2343037 A1 | 3/2000 | |
| CA | 2482620 A1 | 3/2005 | |
| CN | 1307537 A | 8/2001 | |
| CN | 1097027 C | 12/2002 | |
| DE | 839624 | 5/1952 | |
| DE | 860477 | 12/1952 | |
| DE | 907996 | 4/1954 | |
| DE | 1027539 | 4/1958 | |
| DE | 1127279 | 4/1962 | |
| DE | 1019958 | 12/1964 | |
| DE | 1936192 | 5/1970 | |
| DE | 2000266 | 7/1971 | |
| DE | 2142098 | 3/1973 | |
| DE | 2911753 A1 | 10/1980 | |
| DE | 2916253 | 10/1980 | |
| DE | 3106253 A1 | 9/1982 | |
| DE | 3113810 A1 | 10/1982 | |
| DE | 3208916 A1 | 9/1983 | |
| DE | 3433914 A1 | 3/1986 | |
| DE | 3704524 A1 | 11/1989 | |
| DE | 3921887 A1 | 1/1991 | |
| DE | 3921888 A1 | 1/1991 | |
| DE | 3930351 A1 | 3/1991 | |
| DE | 4118946 A1 | 5/1992 | |
| EP | 0134545 A1 | 3/1985 | |
| EP | 0185006 A1 | 6/1986 | |
| EP | 0273479 A1 | 6/1988 | |
| FR | 2161856 | 7/1973 | |
| FR | 2442935 | 6/1980 | |
| GB | 1355039 | 5/1974 | |
| GB | 2243163 | 10/1991 | |
| JP | 52-16629 | 5/1977 | |
| JP | 58-171594 | 10/1983 | |
| JP | 58-222833 | 12/1983 | |
| JP | 59-57464 U | 4/1984 | |
| JP | 59-57878 A | 4/1984 | |
| JP | 59-85728 | 5/1984 | |
| JP | 62-189147 | 8/1987 | |
| JP | 63-10266 Y2 | 3/1988 | |
| JP | 2-277848 | 11/1990 | |
| JP | 4-106092 | 4/1992 | |
| JP | 4-185788 | 7/1992 | |
| JP | 4-194011 | 7/1992 | |
| JP | 7-206351 | 8/1995 | |
| JP | 2002-255470 A | 9/2002 | |
| JP | 2007084979 | 4/2007 | |
| JP | 2007246176 | 9/2007 | |
| SU | 458496 A1 | 1/1975 | |
| SU | 1579452 A3 | 7/1990 | |
| TW | 460405 B | 10/2001 | |
| WO | 00/01607 A1 | 1/2000 | |
| WO | 01/56914 A1 | 8/2001 | |
| WO | 2007/075162 A1 | 7/2007 | |
| WO | 2007/123534 A1 | 11/2007 | |
| WO | 2009/033270 A1 | 3/2009 | |
| WO | 2009/033272 A1 | 3/2009 | |
| WO | 2009/033273 A1 | 3/2009 | |

* cited by examiner

MODIFIED HANDRAIL

CROSS REFERENCE TO RELATED APPLICATIONS

This is a National Stage Entry of International Application No. PCT/CA2008/001599 filed on Sep. 10, 2008, which claims the benefit of U.S. Provisional Application No. 60/971,163 filed on Sep. 10, 2007, and the entire contents of each are hereby incorporated herein by reference.

FIELD

This specification relates generally to the field of handrails for escalators, moving walkways and similar transportation apparatus.

BACKGROUND

U.S. Pat. No. 6,237,740 to Weatherall et al. discloses a moving handrail construction, for escalators, moving walkways and other transportation apparatus having a generally C-shaped cross-section and defining an internal generally T-shaped slot. The handrail is formed by extrusion and comprises a first layer of thermoplastic material extending around the T-shaped slot. A second layer of thermoplastic material extends around the outside of the first layer and defines the exterior profile of the handrail. A slider layer lines the T-shaped slot and is bonded to the first layer. A stretch inhibitor extends within the first layer. The first layer is formed from a harder thermoplastic than the second layer, and this has been found to give improved properties to the lip and improved drive characteristics on linear drives.

INTRODUCTION

A handrail is provided, the handrail having a generally C-shaped cross-section and defining an internal generally T-shaped slot, the handrail comprising: thermoplastic material extending around the T-shaped slot defining semi-circular lip portions having generally opposing end walls, and defining the exterior profile of the handrail; a slider layer lining the T-shaped slot and bonded to the thermoplastic material; and a cable array for inhibiting stretch, the cable array consisting of a plurality of longitudinal cables disposed along a central plane within the thermoplastic material, wherein outside cables of the cable array are offset inwardly in relation to the end walls of the lip portions.

Each of the plurality of cables can have a diameter of 0.5 to 2 mm. The cable array can have a width of 30 to 35 mm and a pitch of 1.5 to 2 mm.

The slider layer can include edge portions extending out of the T-shaped slot and around the end walls of the lip portions.

Another handrail is provided, the handrail having a generally C-shaped cross-section and defining an internal generally T-shaped slot, the handrail comprising: a first layer of thermoplastic material extending around the T-shaped slot defining inner walls of semi-circular lip portions; a second layer of thermoplastic material extending around the outside of the first layer and defining the exterior profile of the handrail and generally opposing end walls of the lip portions; a slider layer lining the T-shaped slot and bonded to the first layer; and a stretch inhibitor disposed along a plane within the first layer.

The first layer can taper in thickness around the lip portions and may not extend substantially below a bottom plane of the T-shaped slot. The first layer can terminate along the inner walls of the lip portions. The handrail can comprise an upper portion above the T-shaped slot and within the upper portion the first layer can be thicker than the second layer. The first layer can comprise at least 60% of the thickness of the handrail in the upper portion. The upper portion can have a thickness of approximately 10 mm and the first layer is at least 6 mm thick.

The first layer can be formed from a harder thermoplastic than the second layer. The first layer can have a hardness in the range 40 to 50 Shore 'D', the second layer can have a hardness in the range 70 to 85 Shore 'A' and the slider layer can have a modulus of 150 to 250 MPa.

The slider layer can include edge portions extending out of the T-shaped slot and around the end walls of the lip portions.

Another handrail is provided, the handrail having a generally C-shaped cross-section and defining an internal generally T-shaped slot, the handrail comprising: a first layer of thermoplastic material extending around the T-shaped slot defining inner walls of semi-circular lip portions; a second layer of thermoplastic material extending around the outside of the first layer and defining the exterior profile of the handrail and generally opposing end walls of the lip portions; a slider layer lining the T-shaped slot and bonded to the first layer; and a cable array for inhibiting stretch, the cable array consisting of a plurality of longitudinal cables arranged along a central plane within the first layer, wherein outside cables in the cable array are offset inwardly in relation to the end walls of the lip portions.

Yet another handrail is provided, the handrail having a generally C-shaped cross-section and defining an internal generally T-shaped slot, the handrail comprising: a first layer of thermoplastic material extending around the T-shaped slot; a second layer of thermoplastic material extending around the outside of the first layer and defining the exterior profile of the handrail; a slider layer lining the T-shaped slot and bonded to the first layer; and a cable array for inhibiting stretch, the cable array consisting of a plurality of longitudinal cables arranged along a central plane within the first layer, wherein each of the longitudinal cables including a plurality of relatively larger outer strands and a plurality of relatively small inner strands.

Each cable can have an outer diameter of about 1.15 mm. Each cable can consist of 6 outer stands and 3 inner strands. The outer strands can have a diameter of approximately 0.36 mm. The inner strands can have a diameter of approximately 0.2 mm. The cables can be formed of high tensile steel, and can be brass plated.

An escalator handrail, having a generally C-shaped cross-section and defining an internal generally T-shaped slot, comprises: a first layer of thermoplastic material extending around the T-shaped slot defining inner walls of semi-circular lip portions; a second layer of thermoplastic material extending around the outside of the first layer and defining the exterior profile of the handrail and generally opposing end walls of the lip portions; a slider layer lining the T-shaped slot and bonded to the first layer; and a cable array for inhibiting stretch, the cable array consisting of a plurality of longitudinal cables disposed along a central plane within the first layer, wherein outside cables of the cable array are offset inwardly in relation to the end walls of the lip portions, and wherein each of the longitudinal cables including a plurality of relatively larger outer strands and a plurality of relatively small inner strands.

These and other features of the applicant's teachings are set forth herein.

DRAWINGS

A detailed description of one or more embodiments is provided herein below by way of example only and with reference to the following drawings, in which.

DESCRIPTION OF VARIOUS EMBODIMENTS

Various apparatuses or methods will be described below to provide an example of an embodiment of each claimed invention. No embodiment described below limits any claimed invention and any claimed invention may cover apparatuses or methods that are not described below. The claimed inventions are not limited to apparatuses or methods having all of the features of any one apparatus or method described below or to features common to multiple or all of the apparatuses described below. One or more inventions may reside in a combination or sub-combination of the apparatus elements or method steps described below or in other parts of this document. It is possible that an apparatus or method described below is not an embodiment of any claimed invention. The applicant(s), inventor(s) and/or owner(s) reserve all rights in any invention disclosed in an apparatus or method described below that is not claimed in this document and do not abandon, disclaim or dedicate to the public any such invention by its disclosure in this document.

Figure 1:
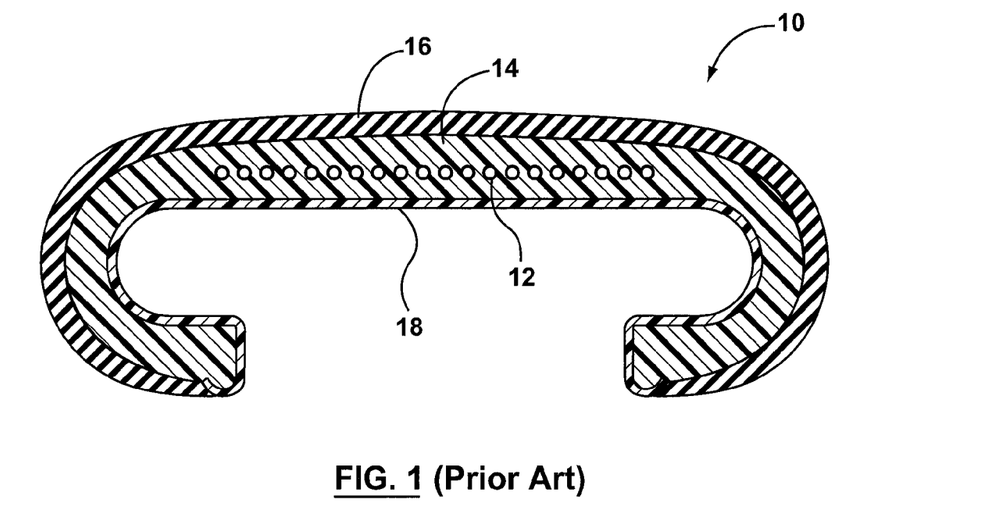
FIG. 1 is a cross-sectional view of a known handrail.

An example of this known handrail construction is shown in FIG. 1. The handrail 10 may include a stretch inhibitor 12, which in this case is illustrated as an array of longitudinal steel cables but can instead comprise steel tape, KEVLAR™ or other suitable tensile elements. As shown, the stretch inhibitor 12 can be supplied embedded in a first or inner layer 14, and can be adhered thereto with a suitable adhesive. The inner layer 14 can be formed of a relatively hard thermoplastic and an outer layer 16 can be formed of a relatively soft thermoplastic. The layers 14, 16 bond directly to one another at an interface to form a continuous thermoplastic body. The T-shaped slot is lined by slider fabric 18. The slider fabric can be an appropriate cotton or synthetic material, with a suitable texture.

Applicant's teachings relate to modified handrail configurations that take into account dynamics and interaction of different materials and layers during flex conditions.

Figure 2:
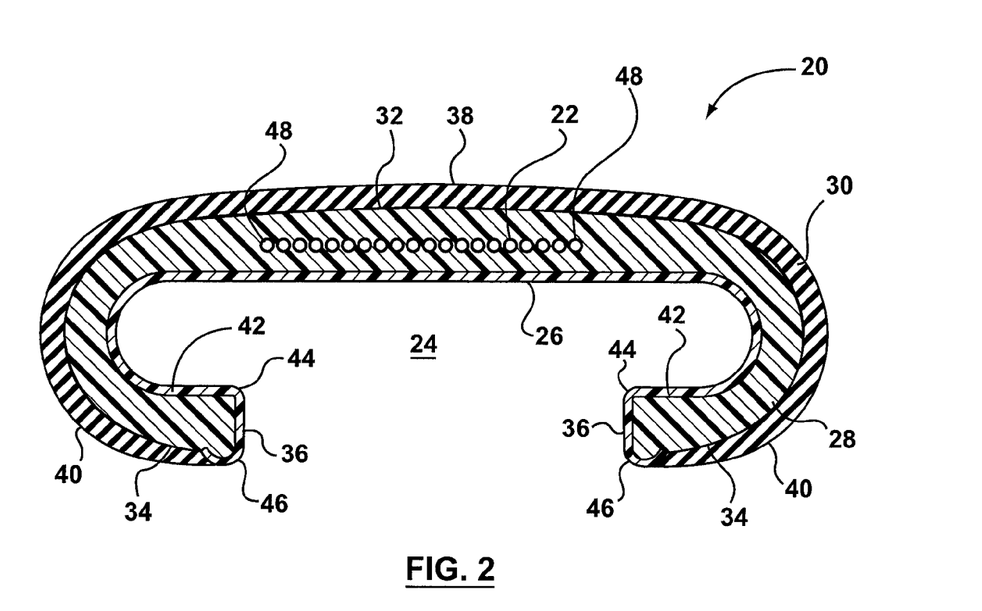
FIG. 2 is a cross-sectional view of a modified handrail.

Referring to FIG. 2, an example of a modified handrail construction is generally designated by the reference 20. The handrail 20 includes a cable array 22 as a stretch inhibitor, discussed more fully below. Surrounding the T-slot 24, the handrail includes a slider 26 bonded to at least the first or inner layer 28. The slider 26 may include end portions wrapped around downwardly facing ribs of the first layer, as illustrated. The inner layer 28 comprises an upper portion or web 32 of generally uniform thickness, which continues into two semi-circular lip portions 34. Correspondingly, the outer layer 30 also comprises an upper portion or web 38 of generally uniform thickness, which continues into two semi-circular lip portions 40. The lip portions 34 include inner walls 42 and the lip portions 34 terminate at generally opposing end walls 36. Each end wall includes an inside edge 44 and an outside edge 46.

The two layers 28, 30 can have different characteristics or hardnesses. In some examples, the outer layer 30 is a softer grade of thermoplastic than the inner layer 28. Example properties of the two layers are given in the Table 1.

TABLE 1

|  | Inner Layer 28 | Outer Layer 30 |
| --- | --- | --- |
| Hardness | 40-50 Shore 'D' | 70-85 Shore 'A' |
| 100% tensile modulus | 11 MPa | 5.5 MPa |
| Flexural modulus | 63 MPa | 28 MPa |
| Shear modulus | 6-8 MN/m$^2$ | 4-5 MN/m$^2$ |

The inner layer 28 can be harder and generally stiffer, and can serve to retain the lip dimension, i.e. the spacing across the bottom of the T-shaped slot 24. The inner layer 28 can also serve to protect the stretch inhibitor 22, in this case steel cables provided in a cable array, and the bond between these cables and the thermoplastic material of inner layer 28 can be provided by a layer of adhesive. Each cable can comprise a number of individual steel wires or strands and overall can have a diameter in the range 0.5 to 2 mm, for example.

It should be understood that handrails typically do not have a flat top surface, but instead there is usually a minor convex curve. Many commercially available transportation apparatus, especially escalators, utilize a reverse bend drive to propel the endless handrail in a particular direction. Under tight reverse bend drive conditions (e.g., with a radius of 275 mm or less) the outer cables within the cable array can be forced out of the neutral axis when in a reverse bend because of the lip portions, or the curved handrail top surface, or both, while the middle cables remain generally in the same plane. With the outer cables pushed away from the neutral flexing plane, buckling can occur. This buckling can cause breakage even after only a few flexes, depending upon the reverse bend radius and the slider modulus.

In some examples, the stretch inhibitor 22 can be disposed within a central plane within the first layer 28, and end cables of the cable array are offset inwardly in relation to the end walls 36 of the lip portions 34. In other words, the handrail 20 has a relatively narrow cable array 22. This feature should be clear to the reader by comparing FIG. 1 to FIG. 2. In operation, having the end cables 48 spaced away from the regions of lip stress can affect the outer cables 48 ability to retain a neutral plane during flexing, lessening chance of outer cables buckling, as further discussed below.

Figure 3:
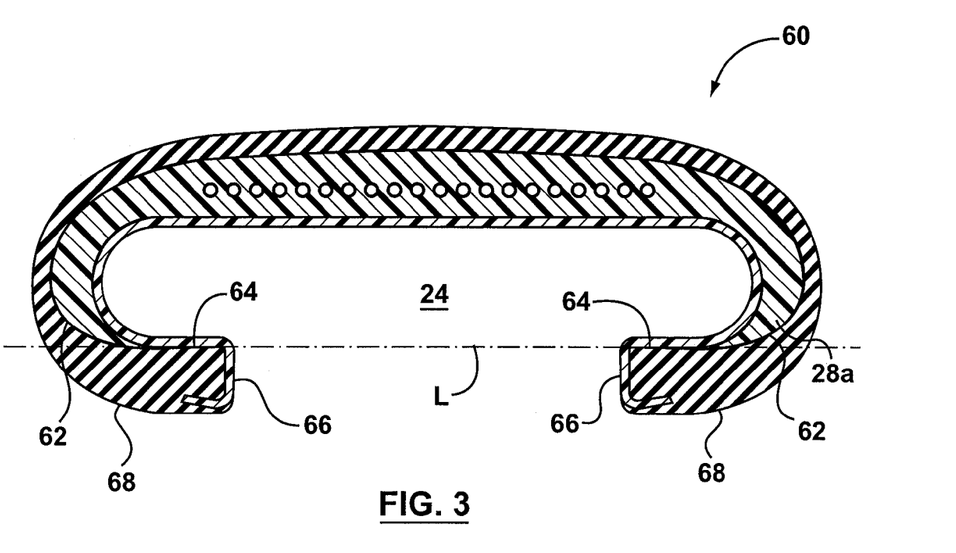
FIG. 3 is a cross-sectional view of another modified handrail.

Referring to FIG. 3, another example of a modified handrail construction is generally designated by the reference 60. For simplicity, like components are given the same reference numeral as in FIG. 2, and the description of the components is not repeated.

In apparatus 60, the inner layer 28 extends around the T-shaped slot 24 defining inner walls of semi-circular lip portions 62. The inner layer 28*a* tapers around the lip portions 62 and terminates along the inner walls 64 of the lip portions 62. Correspondingly, the outer layer 30 has semi-circular end portions 68 having increasing thickness towards the end walls

66. This compensates for the tapering of the inner layer 28a. As illustrated in FIG. 3, the inner layer 28a preferably does not extend below a bottom plane L of the T-shaped slot 24, the bottom plane L being below the slider fabric 14 portions defining the bottom of the upper part of the T-shaped slot 24.

It should be understood that this configuration of the inner layer 28a, which can be 25% stiffer than second layer 30, for example, and having a higher modulus than the material of the second layer 30, moves the inner layer 28a out of the strained location to a relatively lower strained location when under the load of a reverse bend drive. This change can result in a lower overall bending modulus and in a slightly lower or non-existing change in the lip strength. This configuration can also increase the fatigue failure life under cyclic loading conditions.

Figure 4:
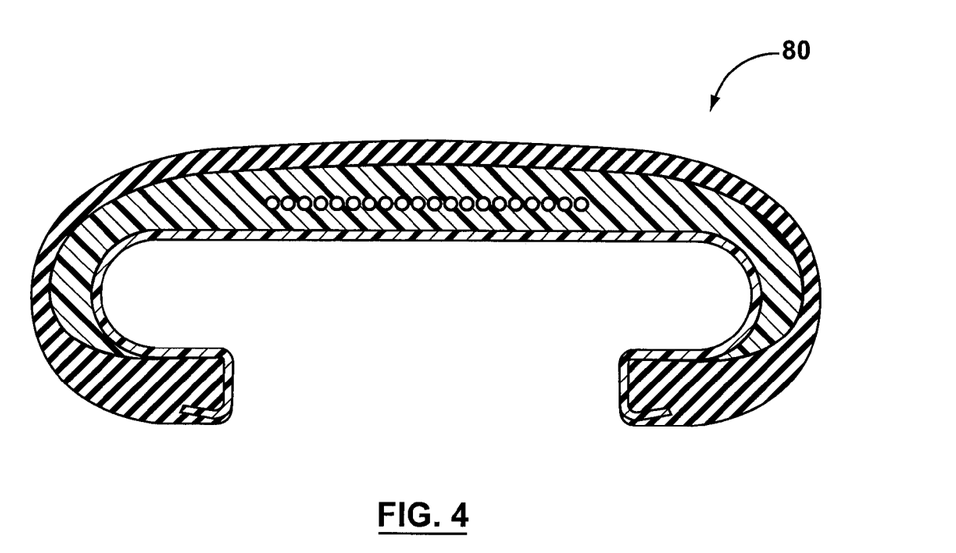
FIG. 4 is a cross-sectional view of yet another modified handrail.

Referring to FIG. 4, another example of a modified handrail construction is generally designated by the reference 80. Handrail 80 is essentially a hybrid combination of handrails 20, 60. In other words, the handrail 80 features (i) a relatively narrow cable array and (ii) a tapered inner layer that does not extend below a bottom plane of the T-shaped slot.

Finite element analysis (FEA) and physical testing was conducted to examine the behavior of various handrails, particularly under severe flexing conditions. One test is a three point reverse bend deformation of 1 m of handrail (80 mm wide with a 45 mm wide cable array comprising 20 cables) supported by two supports spaced apart by 615 mm; a 50 mm diameter round piece is used to deform the handrail 100 mm at a located approximately equidistant from the cylindrical supports.

Figure 5:
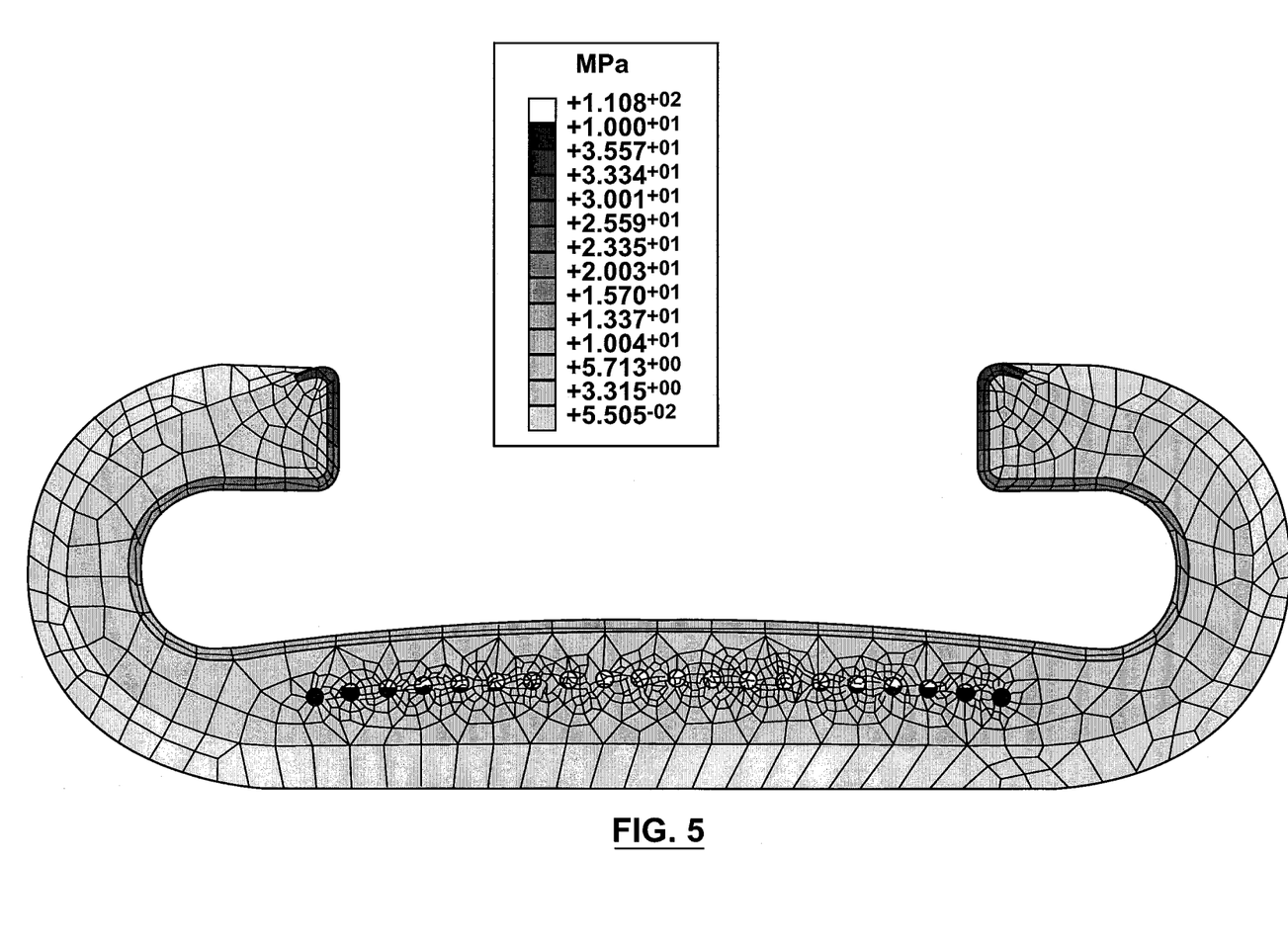
FIG. 5 is a cross-sectional view of a known handrail illustrating simulated stresses according to finite element analysis.

An FEA model was used to simulate a three point reverse bend in accordance with the parameters mentioned above. FIG. 5 is a cross sectional view of a conventional handrail showing the Von Mises stress under deformation. As shown therein, under tensile and bending load the cable array experiences the highest bending stress (indicated by the darker shading), followed by the slider and then the thermoplastic layers.

FEA modeling has lead to the discovery that the slider layer may be the single largest contributing factor in the modulus of a handrail in reverse bend stress scenarios. For this reason, it can be beneficial to pretreat the slider layer prior to forming so as to minimize tension. An example of a method and apparatus for slider layer pretreatment is disclosed in the Applicant's U.S. Provisional Application No. 60/971,156, filed on 10 Sep. 2007 and entitled "METHOD AND APPARATUS FOR PRETREATMENT OF A SLIDER LAYER FOR EXTRUDED COMPOSITE HANDRAILS", and the corresponding PCT Application filed on 10 Sep. 2008, the entire contents of both are incorporated herein by reference.

Figure 6:
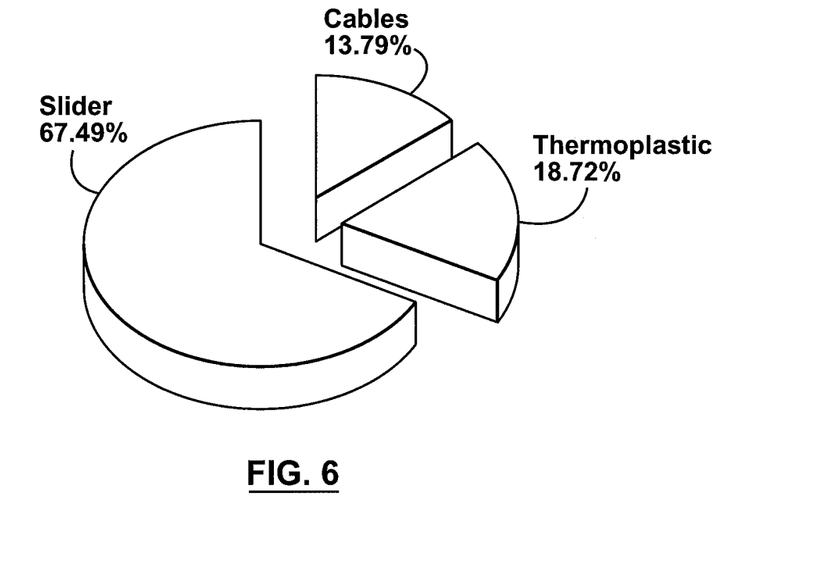
FIG. 6 is a pie chart illustrating the contribution of handrail components to the overall handrail stiffness in reverse bend conditions.
Figure 7:
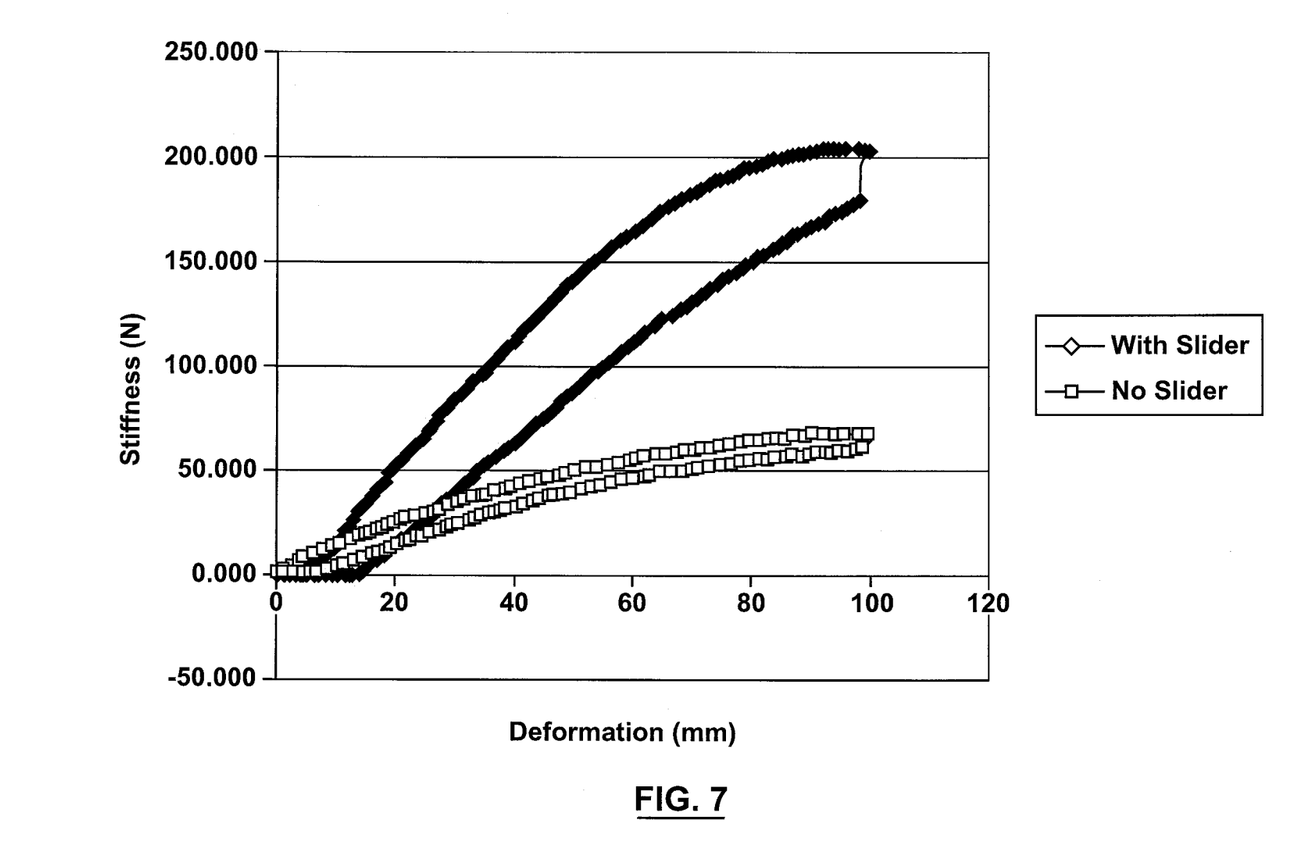
FIG. 7 is a graph illustrating the stiffness of handrails in reverse bend with and without the slider fabric.

FIG. 6 is a representation of the results obtained from a FEA model with no handrail tension. This shows the contribution of various components of the handrail in regards to the overall handrail stiffness. INSTRON™ testing of handrails, with and without sliders, in accordance with the parameters mentioned above, confirmed that the slider can be the main contributor in handrail's stiffness (FIG. 7). In this test, a regular handrail was subjected to 100 mm deformation (a complete cycle) with and without the slider. The graph illustrates that a handrail without the slider is significantly less stiff in reverse bending.

Given this discovery, it is preferable to be use a lower modulus slider. A lower modulus slider reduces handrail stiffness in reverse bending and also improves the overall Von Mises stress in the handrail, thus improving product fatigue life. The slider layer undergoes tensile loading during handrail bending, so a modulus value should be chosen that provides sufficient structural strength with a low overall handrail bend modulus. FEA studies showed that slider layer having a modulus of around 150-250 MPa is suitable for handrail according to the configuration mentioned above, noting that the maximum strain on the slider layer during flexing in most escalator units is up to 6%.

FEA models were further developed to understand the handrail composite behavior mostly in reverse bending, also with the help of INSTRON™ tests validation method. These analyses showed that although the steel cables in current handrail configurations may contribute 19% in reverse bend stiffness, this could increase depending on particular deformation conditions, such as reverse bend radius and the amount of slider stretch. At higher deformations, the lips start to displace the end cables and force them to move out of the plane of rest of the cables. This results in higher ultimate bending modulus, and under severe bending causes the outermost cables to buckle. Steel cables tend to be relatively hard, having a hardness of up to 67 Rockwell C-Scale, for example, and therefore buckling can occur relatively easily. This phenomenon is more pronounced under certain conditions, such as when the handrail is in reverse bending without the outer surface being supported by a pulley or drive roller, which is possible if the handrail is running loose on the escalator. Under this condition, if the handrail outer surface is not supported, the lip portions can exert excessive stresses on outer cables and can cause them to buckle very quickly.

To avoid the outermost cable buckling phenomenon under severe flexing conditions causing (a) the potential cable failures and (b) higher bending stiffness, FEA studies were conducted to review the particular solution proposed to an aspect of the present invention, namely, narrowing the cable array such that the outer cables are offset inwardly in relation to the lip portions. This can be achieved by reducing the cable pitch within the cable array in the composite structure, which maintaining the same number of cables.

As an example, a known handrail may comprise a cable array having 20 longitudinal cables with a cable pitch of 2.3 mm, which gives a 45 mm wide cable array. Models were developed with 1.65 mm pitch which gives 33 mm wide cable array. The studies showed a significant improvement in both cable buckling behavior and reduction in overall handrail bending stiffness with a lower pitch distance. Specifically, it was found that around 15% less force was required for a 33 mm cable array handrail than for a 45 mm wide cable array handrail to achieve a reverse bend radius of 250 mm, under identical conditions. These results were also validated by INSTRON™ testing and the handrail with a narrower cable array width exhibited a lower reverse bend stiffness.

Figure 8A:
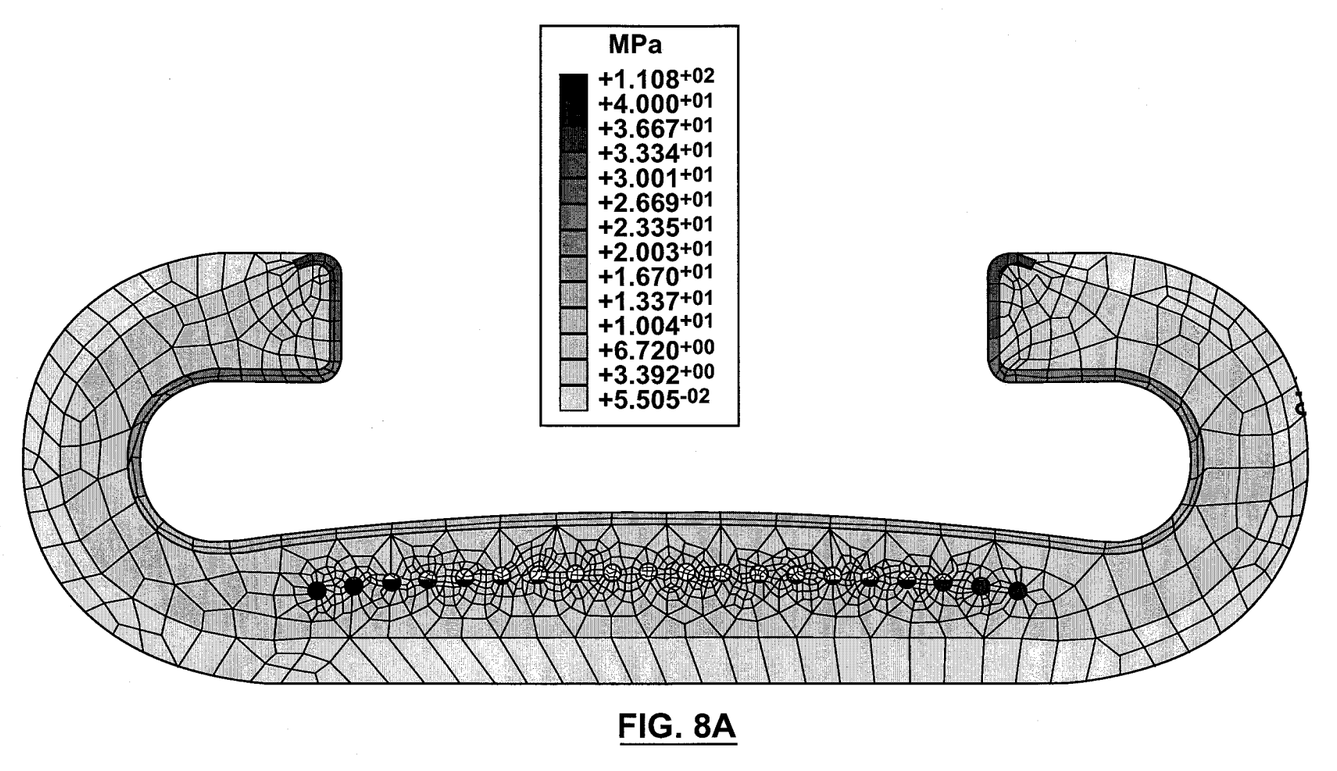
FIGS. 8A and 8B are cross-sectional views of handrails having 45 and 33 mm cable arrays, respectively, and illustrate simulated stresses therein.
Figure 8B:
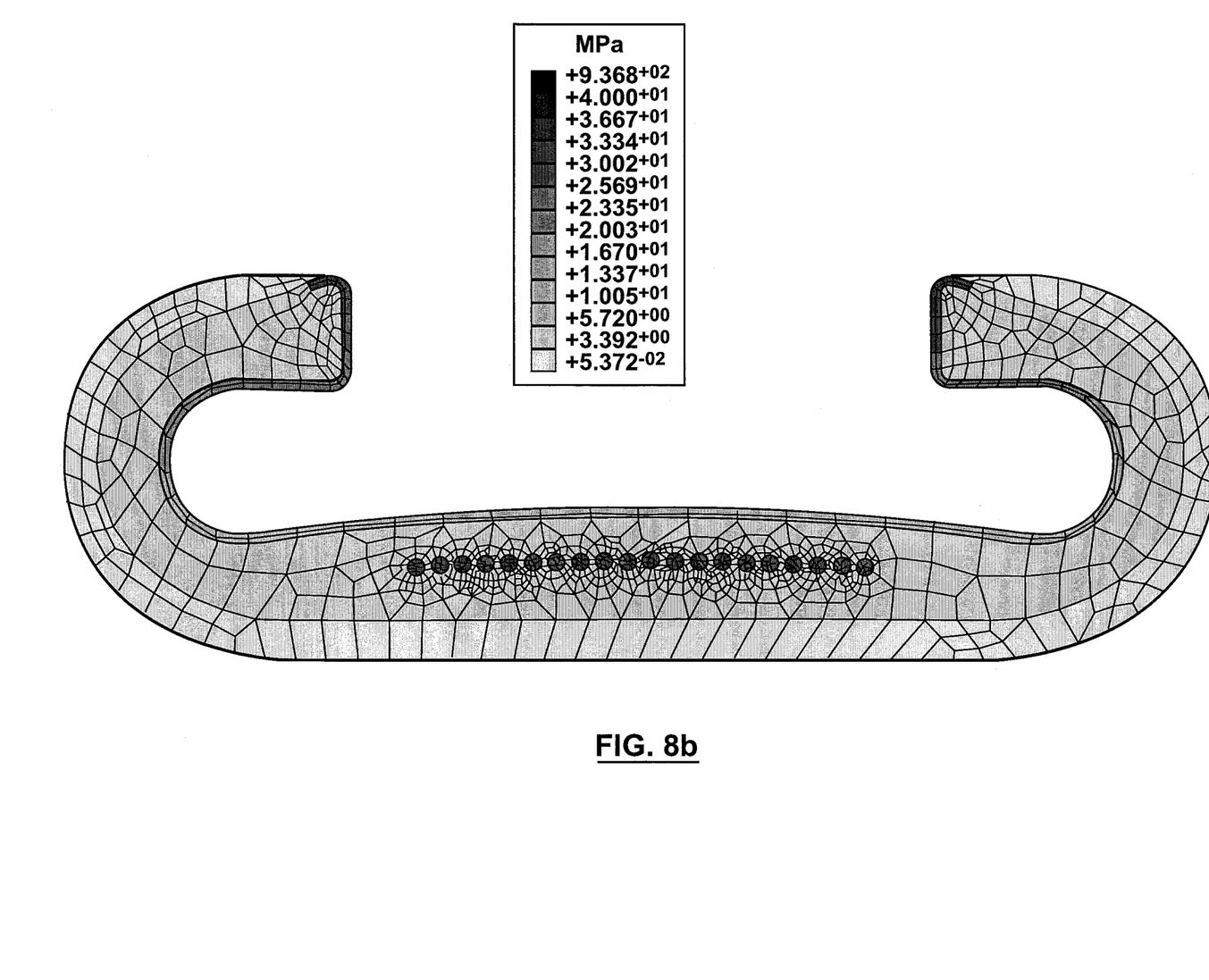

The higher Von Mises and the outer cable movement could also be seen in sections of FEA models when handrails with both a 45 mm wide cable array and a 33 mm wide cable array were deformed under similar conditions. As shown in FIGS. 8A and 8B, the outer cables in the 45 mm cable array (FIG. 8A) have a higher bending stress (darker shading) than the outer cables in the 33 mm cable array (FIG. 8B). Moving outer cables away from the lip stress line significantly affects the outer cables ability to retain their original plane during flexing and therefore lessening the chances of outer cables buckling.

FEA studies were also conducted to examine the location and ratios of the two layers of thermoplastic material under severe flexing conditions. As discussed above, conventional handrail designs where the inner layer extends or reaches to the end wall of the lip portion may result in good lip strength but leads to higher strain and overall higher bending stresses in the lip portions of the handrail. As a particular aspect of the present invention, this is improved by reconfiguring the inner layer so that it tapers and terminates along the inner wall of the lip portion, not below a bottom plane of the T-shaped slot.

Figure 9:
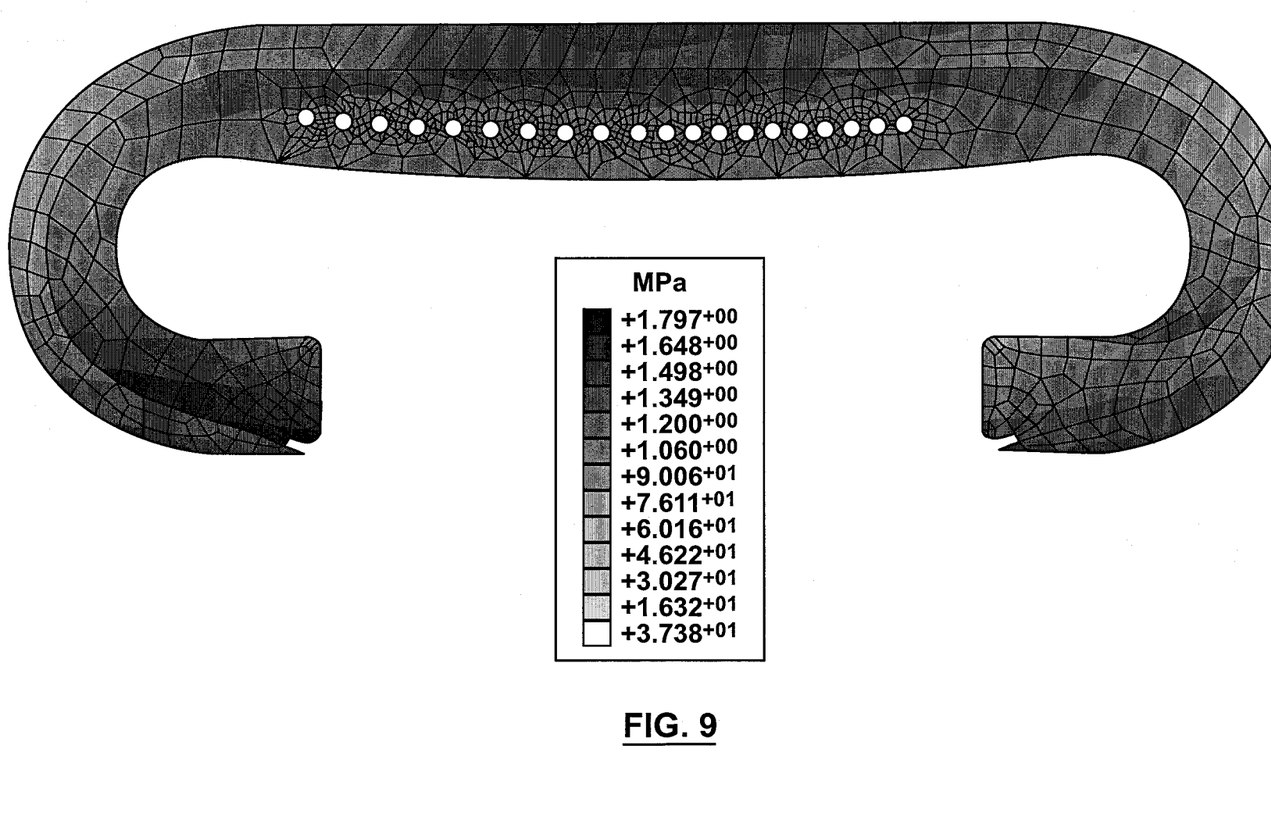
FIG. 9 is a cross-sectional view of a modified handrail illustrating simulated stresses therein.

With reference to FIG. 9, the modifications to the cross sectional configuration of the handrail design can be seen in the stress diagram (no slider is shown). This hybrid model depicts a conventional handrail design on the left and a modified handrail on the right, the modified handrail including a narrowed cable array (33 mm in width) and the modified first and second layer profile. Illustrated therein is a higher distribution of Von Mises stress in the lip portion of the conventional handrail design, which is shown to be much darker than the same region in the modified lip portion.

In addition, it should be understood that another feature that may be important for the performance of the handrail is the radii of the lip portions. The inventors have discovered, through FEA analysis, that a smaller lip portion radii may correlate with an increase in the stiffness of the handrail during bending and may also create high stresses. Because of this, it is preferable that both the inside and outside radii of the lip portions be increased rather than decreased when determining handrail design. For example, for an 80 mm wide handrail a lip portion with an inner radius of about 2.0 mm and an outer radius of about 2.0 to 2.25 mm may be suitable.

Figure 10:
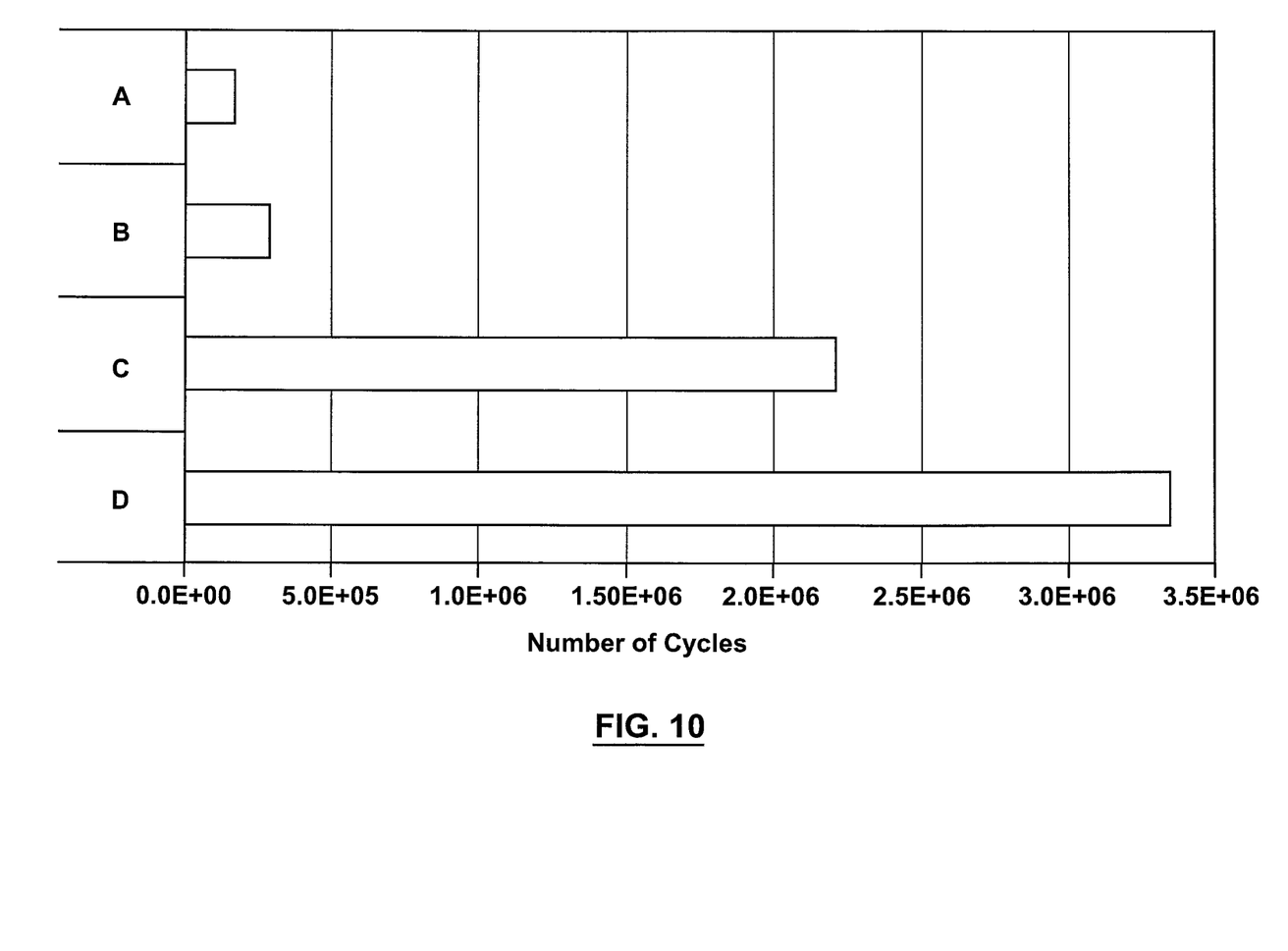
FIG. 10 is a graph illustrating the results of dynamic handrail testing.

With reference to FIG. 10, dynamic handrail testing was performed on a escalator drive mechanism test rig, including a 267 mm radius reverse bend, which was run at high speeds (approximately 255 m/min). These tests were performed to validate modifications to the handrail design. Test handrails A and B represent conventional designs (80 mm wide with a 45 mm wide cable array comprising 20 cables; the inner layer extending to end walls of the lip portions). Test handrails C and D represent modified designs (80 mm wide with a 33 mm wide cable array comprising 20 cables; inner layer tapers and terminates along inner walls of the lip portions, not below a bottom plane of the T-shaped slot; slider layer with modulus 200 to 250 MPa).

As shown, the modified designs C and D exhibited superior performance, with the handrails capable of achieving more than two million cycles minimum without failure.

Figure 11A:
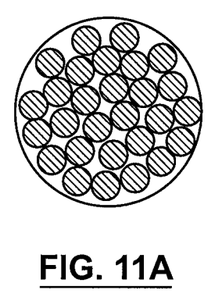
FIGS. 11A and 11B illustrate cross-sections of a cable structure.

An example of a typical cable cross sectional configuration is shown in FIG. 11A. Such a conventional steel cable, comprised of small individual strands, e.g., in a "7+4" pattern, may suffer from poor penetration of rubber/thermoplastic/adhesive. As a general problem, fretting and/or corrosion may occur in a steel cable if individual wires are not protected and shielded from one another by rubber, thermoplastic, adhesive, etc. If fretting or corrosion occurs, the handrail may shrink which is undesirable and can lead to failure of the handrail.

Figure 11B:
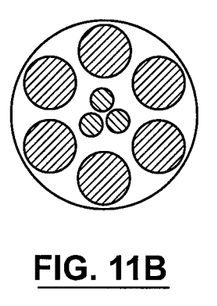

A stretch inhibitor with a particular cross-sectional configuration is provided as illustrated in FIG. 11B. As shown therein, the "3+6" pattern comprises large outer strands and small inner strands of steel cable. This configuration can allow for good penetration of rubber, thermoplastic, adhesive, etc. For example, given the handrail construction described above, the first layer of thermoplastic material can be able to substantially penetrate and protect the cables, and the high adhesion results in a product that is resistant to length change. This penetration can be achieved by extruding the thermoplastic and steel cables together under suitable pressure conditions that promote penetration of the thermoplastic into the interstices between the individual strands. An example of a method and apparatus for extrusion of thermoplastic handrail is disclosed in the Applicant's U.S. Provisional Application No. 60/971,152, filed on 10 Sep. 2007 and entitled "METHOD AND APPARATUS FOR EXTRUSION OF THERMOPLASTIC HANDRAIL", and the corresponding PCT Application filed on 10 Sep. 2008, the entire contents of both are incorporated herein by reference.

Table 2 below provides example specifications for a suitable stretch inhibitor cable with a cross-section as illustrated in FIG. 11B. Suitable cable in line with these example specifications can be obtained from Bekaert SA, of Kortrijk, Belgium.

TABLE 2

| Type | — | High tensile steel cord, brass plated |
|---|---|---|
| Construction | mm | 3 × 0.20 +/− 0.01 + 6 × 0.36 +/− 0.01 |
| Twist (lay length) | 1 turn per | 9.5 +/− 0.5 mm Z + 18.0 +/− 0.9 mm S |
| Linear density | g/m (lb/ft) | 5.59 +/− 0.28 (0.00376 +/− 0.00019) |
| Diameter | mm (in) | 1.15 +/− 0.06 (0.045 +/− 0.0024) |
| Strength - minimum individual | N (lb) | 1870 (420) |
| Strength - aim | N (lb) | 1990 (447) |

It will be appreciated by those skilled in the art that other variations of the one or more embodiments described herein are possible and may be practised without departing from the scope of the present invention as claimed herein.

We claim:

1. A handrail having a generally C-shaped cross-section and defining an internal generally T-shaped slot, the handrail comprising:
   a) a first layer of thermoplastic material extending around an upper part of the T-shaped slot defining inner walls of semi-circular lip portions, wherein the first layer of thermoplastic material tapers in thickness around the lip portions, and terminates along the inner walls of the lip portions;
   b) a second layer of thermoplastic material extending around the outside of the first layer of thermoplastic material and defining the exterior profile of the handrail and generally opposing end walls of the lip portions, wherein the first layer of thermoplastic material is formed from a harder thermoplastic than the second layer of thermoplastic material;
   c) a slider layer lining the T-shaped slot and bonded to the first layer of thermoplastic material; and
   d) a cable array for inhibiting stretch, the cable array consisting of a plurality of longitudinal cables disposed along a central plane within the first layer of thermoplastic material, wherein outside cables of the cable array are offset inwardly in relation to the end walls of the lip portions,
   wherein the T-shaped slot has a bottom plane defining a bottom of the upper part of the T-shaped slot,
   wherein the bottom plane of the T-shaped slot is coplanar with each of the inner walls of the lips portions, and
   wherein the first layer of thermoplastic material does not extend below the bottom plane of the T-shaped slot.

2. The handrail of claim 1 wherein the cable array has a width of 30 to 35 mm.

3. The handrail of claim 2 wherein the cable array has a pitch of 1.5 to 2 mm.

4. The handrail of claim 3 wherein each cable has an outer diameter of about 1.15 mm.

5. The handrail of claim 4 wherein the cable array has a width of about 33 mm, and a pitch of about 1.65 mm.

6. The handrail of claim 2 wherein the handrail comprises an upper portion above the T-shaped slot and within the upper portion the first layer of thermoplastic material is thicker than the second layer of thermoplastic material.

7. The handrail of claim 6 wherein the first layer comprises at least 60% of the thickness of the handrail in the upper portion.

8. The handrail of claim 7 wherein the upper portion has a thickness of approximately 10 mm and the first layer is at least 6 mm thick.

9. The handrail of claim 1 wherein the slider layer has a modulus of 150 to 250 MPa.

10. The handrail of claim 2 wherein the slider layer has a modulus of 150 to 250 MPa.

* * * * *